March 4, 1952
M. CAMRAS
2,587,593
APPARATUS FOR SUPPLYING MECHANICAL RECORDING BIAS TO MAGNETIC RECORDERS
Filed Aug. 31, 1946
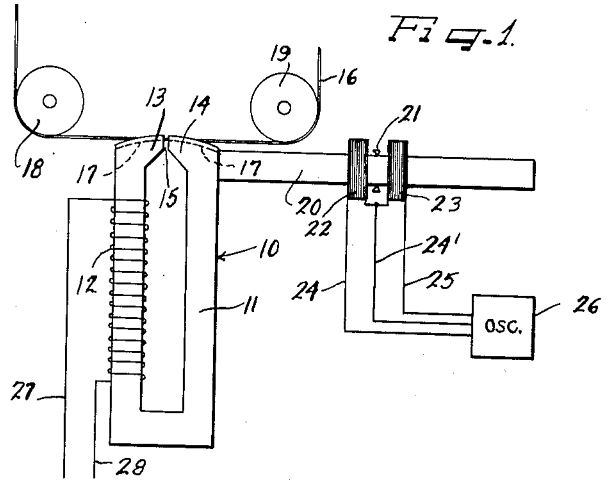
Fig. 1
Fig. 2
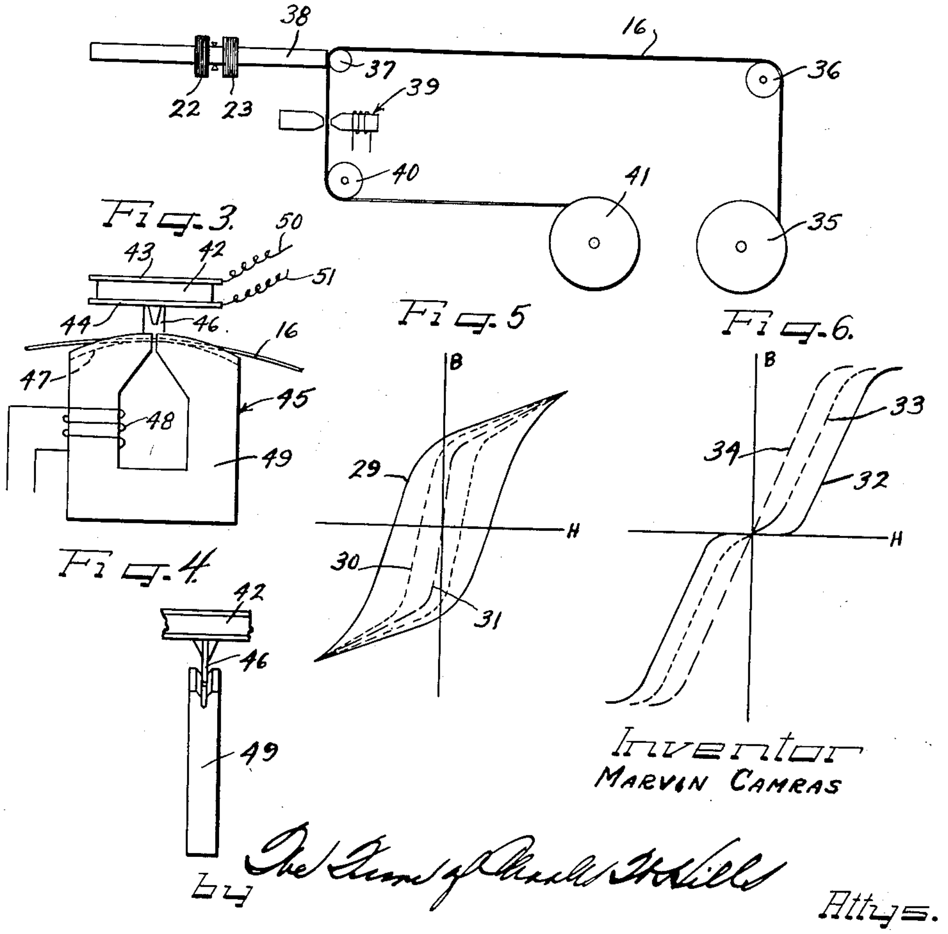
Fig. 2, Fig. 3, Fig. 4, Fig. 5, Fig. 6
Inventor
MARVIN CAMRAS
by The Firm of Chas. Hills
Attys.

Patented Mar. 4, 1952

2,587,593

UNITED STATES PATENT OFFICE 2,587,593

APPARATUS FOR SUPPLYING MECHANICAL RECORDING BIAS TO MAGNETIC RECORDERS

Marvin Camras, Chicago, Ill., assignor to Armour Research Foundation of Illinois Institute of Technology, Chicago, Ill., a corporation of Illinois Application August 31, 1946, Serial No. 694,354

5 Claims. (Cl. 179—100.2)

This invention relates to a magnetic recording method and means, and more particularly, to a magnetic recording system in which the magnetic record member is mechanically vibrated at high frequency, while subjecting it to the influence of a fluctuating magnetic field.

It is well known in the magnetic recording art that greatly improved results can be obtained by superimposing a high frequency magnetic field on the field established by the signal to be recorded during the recording process. There are certain disadvantages to the use of such a high frequency component, due to the super-position of one magnetic field on another, and this is particularly true where the signal to be recorded is of itself relatively high frequency.

I have discovered that substantially all of the advantages of a high frequency magnetic component without any of the inherent disadvantages may be obtained by mechanically vibrating the magnetic record member itself during the time that it is subjected to the action of a fluctuating field excited by the signal to be recorded.

I have further found that the characteristic magnetic hysteresis loop of the material is changed when the magnetic record member is subjected to a high frequency mechanical vibration.

I have further found that the intial magnetization curve of the magnetic record member assumes a much more linear aspect as it passes through the zero axis of the B—H curve of the material when it is subjected to high frequency mechanical vibration.

One of the principal features and objects of the present invention is to provide a novel magnetic recording method and means in which the magnetic record member is mechanically vibrated at high frequency while it is subjected to a magnetic field excited by the signal to be recorded.

A further object of the present invention is to provide a novel magnetic recording method and means in which the magnetic record member is vibrated by magneto-striction.

A further object of the present invention is to provide a novel magnetic recording method and means in which the magnetic record member is mechanically vibrated by a piezoelectric crystal while a signal is being recorded on the record member.

Another and further object of the present invention is to provide a magnetic recorder in which the record member is longitudinally vibrated as a signal is being recorded thereon.

Another and still further object of the present invention is to provide a magnetic recorder in which the record member is transversely vibrated as a signal is being recorded thereon.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in conjunction with the accompanying drawings, in which:

Figure 1 is a diagrammatic illustration of a magnetic recording head having a wire passing thereover and which is provided with means for longitudinally vibrating the wire;

Figure 2 is a diagrammatic illustration of a magnetic recorder in which means is provided for transversely vibrating a magnetic record member;

Figure 3 is a diagrammatic illustration of a third embodiment of the present invention in which a record member and a magnetic recorder head are vibrated by a piezoelectric crystal;

Figure 4 is an end view of the assembly shown in Figure 3;

Figure 5 is a diagram showing the hysteresis curves of a magnetic record member, with and without mechanical vibration; and Figure 6 is a diagram illustrating the family of initial magnetization curves of the magnetic record member, without mechanical vibration and with varying degrees of mechanical vibration.

In Figure 1 of the drawing, I have diagrammatically illustrated a magnetic recorder including a magnetic recorder head 10 having a U-shaped core piece 11 upon which a signal coil 12 is wound. The core 11 has a pair of confronting pole portions 13 and 14 with a non-magnetic gap 15 therebetween. A magnetic record member 16, such, for example, as a wire, is arranged to pass lengthwise across the pole portions 13 and 14 through a slotted recess 17. The winding and reeling mechanism of the wire record member 16 is not shown, other than a pair of guide pulleys 18 and 19 which are illustrated on opposite sides of the head 10 over which the wire 16 is arranged to pass.

The wire 16 lies in the grooves 17 in each of the pole portions 13 and 14, and has a relatively snug sliding fit therewith.

Mounted adjacent the head 10 is a magneto-striction bar 20 which is supported at a nodal point of mechanical vibration by any suitable means such as diagrammatically illustrated at 21. A pair of electric coils 22 and 23 surround the bar 20 and are connected through conductors 24, 24′ and 25 to any suitable source of electric oscillations 26. The bar 20 at one end is in engagement with the core 11.

The coils 22 and 23 are suitably connected and wound with respect to each other, so that upon excitation from the oscillator 26, the bar 20 will be longitudinally vibrated.

Magneto-striction bars per se are, of course, well known, and may be formed of any magnetostrictive material, such, for example, as nickel steel. Magneto-stricture materials are those materials having the property that they expand and contract in a fluctuating magnetic field.

The longitudinal extension and contraction of the bar 20 at relatively high frequency causes the wire 16 passing through the slots 17 in the head 10 to be alternately stretched and released. This is due to the fact that the wire 16 having friction against the head 10 will be stretched and released as the head is vibrated by the bar 20.

Simultaneously with the vibration of the head 10 by the bar 20, the coil 12 is excited through the conductors 27 and 28 by the fluctuating electric energy representing the signal to be recorded on the wire 16.

Referring to Figure 5 of the drawing, a magnetic hysteresis loop of the wire 16 when it is not being vibrated is illustrated by the curve 29. It has been found that the magnetic properties of the wire 16 change when the wire is vibrated by the magneto-striction bar 20, and the hysteresis loop 29 tends to contract as the effect of the bar 20 becomes more pronounced. The curve 30 in Figure 5 represents a typical condition when the wire 16 is vibrated by the bar 20. The curve 31 represents the limiting condition.

In Figure 6 of the drawing, a family of initial magnetization curves are shown. The solid line curve 32 is the initial magnetization curve of the wire 16 when it is not being subjected to mechanical vibration. The curve 33 is the same wire being vibrated by the magneto-striction bar 20, and the curve 34 represents the optimum or ideal condition.

In Figure 2 of the drawing, I have illustrated a second embodiment of the present invention wherein the wire 16 is transversely, rather than longitudinally, vibrated during the recording process. More particularly, in the system shown in Figure 2, the wire 16 is taken off of a supply spool 35, passed over a guide pulley 36, over a finger 37 on a magneto-striction bar 38, through a recording head 39, over a guide pulley 40 and wound up on the take-up reel 41.

The head 39 itself is not vibrated in this case, but rather the wire 16 is vibrated immediately to one side of the head. The magneto-striction bar 38 is excited by the coils 22 and 23 as described in connection with Figure 1. The longitudinal vibration of the bar 38 causes transverse mechanical movement of the wire 16. A result similar to that described in connection with Figure 1 of the drawing is obtained in this case.

A third embodiment of the present invention is illustrated in Figures 3 and 4 of the drawing wherein a piezoelectric crystal 42 mounted between the plates 43 and 44 is employed to vibrate the wire 16 through a tongue 46 which extends down into the wire-receiving slot 47 of the head 45 and lies against the wire 16. The head 45 includes a signal coil 48 wound on the core 49.

The piezoelectric crystal 42 is excited through the circuit conductors 50 and 51, and when energized with high frequency current of proper value causes transverse stressing of the wire during the recording process.

The underlying principle of the present invention lies in the mechanical periodic stressing of the magnetic record medium. This may be done by stressing it lengthwise as in Figure 1 of the drawing, or stressing it transversely as in Figures 2 and 3 of the drawing, or in any other suitable manner, it being only necessary that the record medium be periodically stressed at high frequency during the recording process. It will thus be understood that any stressing, whether it is longitudinal, transverse or torsional, may be employed.

While I have shown certain particular embodiments of my invention, it will, of course, be understood that I do not wish to be limited thereto, and I, therefore, contemplate by the appended claims to cover all such modifications that fall within the true spirit and scope of my invention.

I claim as my invention:

1. A magnetic recorder for recording fluctuating electric energy on a magnetizable record member which includes at least one magnetic pole member in contact with and across which said record member is arranged to pass, means for establishing a fluctuating flux in said pole member which is a function of the fluctuating electric energy to be recorded, a magneto-striction member, means for supporting said magneto-striction member at a nodal point of mechanical vibration thereof, and means for establishing a high frequency magnetic field around said magneto-striction member to vibrate said pole member while said record member is passing across said pole member.

2. A magnetic recorder for recording fluctuating electrical energy on an elongated magnetizable record member which comprises at least one magnetic pole member in contact with and across which said record member is arranged to pass, means for establishing a fluctuating magnetic flux in said pole member as a function of fluctuating electrical energy to be recorded, and means for mechanically vibrating a portion of said record member as said portion passes across said pole member in an amount sufficient to improve the linearity of the initial magnetization characteristic of the magnetic record member.

3. A magnetic recorder for recording fluctuating electrical energy on a magnetizable record medium which includes a pair of magnetic pole members having a non-magnetic gap therebetween across which said record member is arranged to pass, means for varying the magnetic flux across said gap in response to the variations of said fluctuating electrical energy, and means for mechanically vibrating at least one of said pole members in the region of said gap in an amount sufficient to improve the linearity of the initial magnetization characteristic of the magnetic record member.

4. A magnetic recorder for recording fluctuating electrical energy on a magnetizable record member which includes a pair of magnetic pole members having a non-magnetic gap therebetween across which said record member is arranged to pass, means for varying the magnetic flux across said gap in response to the variations of said fluctuating electrical energy, a magnetostrictive element mechanically coupled to one of said pole members, and means for magnetically energizing said magneto-strictive element at a relatively high frequency to vibrate said element and thereby vibrate said pole member in the region of said gap.

5. A magnetic recorder for recording fluctuating electrical energy on an elongated magnetizable record member which comprises at least one magnetic pole member in contact with and across which said record member is arranged to pass, means for establishing a fluctuating magnetic flux in said pole member as a function of fluctuating electrical energy to be recorded, and means for mechanically vibrating a portion of said record member at a controlled frequency as said portion passes across said pole member in an amount sufficient to improve the linearity of the initial magnetization characteristic of the magnetic record member.

MARVIN CAMRAS.

REFERENCES CITED

The following references are of record in the file of this patent:

UNITED STATES PATENTS

| Number | Name | Date |
|---|---|---|
| 1,325,574 | Nichols | Dec. 29, 1919 |
| 1,640,881 | Carlson | Aug. 30, 1927 |
| 2,234,968 | Hayes | Mar. 18, 1941 |
| 2,334,593 | Wyckoff | Nov. 16, 1943 |
| 2,351,003 | Camras | June 13, 1944 |

FOREIGN PATENTS

| Number | Country | Date |
|---|---|---|
| 118,407 | Germany | Aug. 11, 1899 |
| 236,050 | Switzerland | May 16, 1945 |
| 547,082 | Great Britain | Aug. 12, 1942 |

OTHER REFERENCES

Scientific Papers of the Bureau of Standards, No. 78, "The Best Method of Demagnetizing Iron in Magnetic Testing." Pages 264–265.